(12) United States Patent
Rodriguez

(10) Patent No.: US 7,794,816 B2
(45) Date of Patent: Sep. 14, 2010

(54) PAPERBAND

(76) Inventor: Peter A. Rodriguez, 1545 Main St., Atlantic Beach, FL (US) 32233

( * ) Notice: Subject to any disclaimer, the term of this patent is extended or adjusted under 35 U.S.C. 154(b) by 0 days.

(21) Appl. No.: 12/386,437

(22) Filed: Apr. 17, 2009

(65) Prior Publication Data

US 2009/0208702 A1 Aug. 20, 2009

Related U.S. Application Data

(63) Continuation-in-part of application No. 11/142,951, filed on Jun. 2, 2005, now abandoned.

(51) Int. Cl.
*B32B 3/28* (2006.01)
(52) U.S. Cl. ...................... 428/126; 428/130; 242/526.2
(58) Field of Classification Search ................ 428/126, 428/130; 242/526.2
See application file for complete search history.

(56) References Cited

U.S. PATENT DOCUMENTS

| 2,499,463 | A | 3/1950 | Crary |
| 3,126,312 | A | 3/1964 | Nickerson |
| 4,414,258 | A | 11/1983 | Corbin, Sr. |
| 5,816,526 | A | 10/1998 | Bartelmuss et al. |
| 6,458,448 | B1 | 10/2002 | Hunt |
| 2004/0131825 | A1 | 7/2004 | Dever et al. |

FOREIGN PATENT DOCUMENTS

JP 2001/278327 10/2001

*Primary Examiner*—Alexander Thomas
(74) *Attorney, Agent, or Firm*—Thomas C. Saitta

(57) ABSTRACT

A tri-fold paperband of paperboard having two side portions folded across a center portion in overlapping manner to form a three layer middle portion, the side portions being of a width greater than half of the width of the center portion but of lesser width than the center portion, such that the side portions overlap, and such that two flexible lateral portions are defined having only two layers.

19 Claims, 1 Drawing Sheet

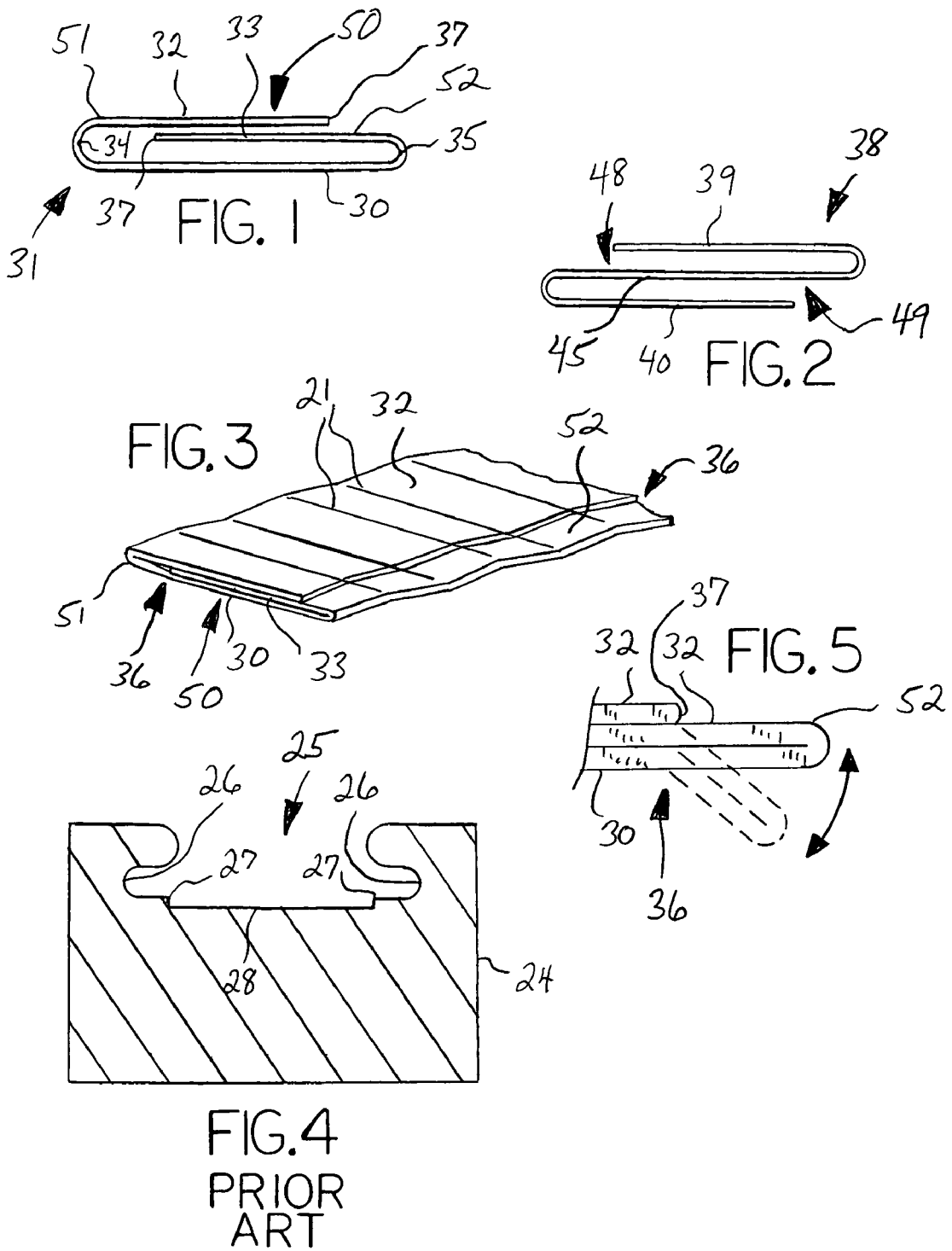

PAPERBAND

This application is a continuation-in-part application and claims the benefit of U.S. patent application Ser. No. 11/142,951, filed Jun. 2, 2005, now abandoned the disclosure of that application being incorporated herein by reference.

BACKGROUND OF THE INVENTION

This invention relates to a paperband composed of a tri-folded sheet of paperboard, and more particularly to paperbands which may include longitudinal indentations and transverse undulations to create a corrugated structure to control stiffness and flexibility of the band as desired, and further wherein the paperband may be provided in a rolled configuration.

It is a common practice in the papermaking and packaging industries to employ a paperband or strap that is loaded into a channel of a track assembly and then removed rapidly out of the channel, often employed to cut and spool a web of paper onto an empty spool or used to wrap around and secure a load, container or a bundle of material. Because the paperband needs to be stiff enough to be pushed into the channel from one end thereof, the band may twist or otherwise be distorted, crimped or separated during removal from the paperband track assembly. This becomes a very important consideration in those applications where the width of the channel opening is made less than the width of the band or tape and the lower tape-carrying guide way of the channel in order to cover and carry the tape. An improved paperband is disclosed herein that greatly reduces the distortion and crimping common to prior art paperbands, reduces the wear on the guide way channel and its cover, and also reduces the separation of layers in some bands made from multiple layers.

Examples of the prior art include U.S. Pat. No. 5,816,526, which discloses various multi-ply folded strips held together by adhesive. U.S. Pat. No. 3,126,312 discloses a plurality of elongate members aligned in a plane and held together by adhesive. U.S. Pat. No. 4,414,258 discloses a woven ribbon made of flat strips and weft filaments, which are held in place by adhesive. U.S. Pat. No. 2,499,463 discloses a multi-ply paper strap provided with transverse creases.

U.S. Patent Publication No. 2004/0131825 A1 (Jul. 8, 2004) discloses a strap constructed of a double layer of elongated paper elements secured with adhesive on at least a portion of the strap.

None of the above-described paper devices is satisfactory for use in a paperband track assembly beneath wide paper machines for the reason that they do not have the required stiffness for such use. It is an object of this invention to provide a paperband capable of being disposed in a rolled configuration, the paperband being formed of a relatively stiff paperboard material, the term paperboard having a known meaning in the art, wherein the paperband is configured in a longitudinal tri-fold structure with the inwardly folded portions of the paperband being of a width less than the overall width of the folded paperband, such that the interior portion of the paperband consists of three overlapping layers while the edge portions consist of two overlapping layers.

BRIEF SUMMARY OF THE INVENTION

As an embodiment of the present invention there is provided a paperband adaptable for use in paper web cutting and turn-up systems or for use in baling, the paperband comprising an elongate multi-ply paperboard having upper and lower surfaces, and in the unfolded configuration a center portion and spaced reduced side portions, each side portion having an inside edge portion and an outside edge portion, each inside edge portion preferably being defined by an elongate longitudinal first groove or crease between the center portion and respective side portion. Each side portion is folded about the respective groove to dispose each side portion in contact with an adjacent portion of the center portion to form a tri-fold configuration. The side portions may be folded to the same side of the center portion or to opposite sides of the center portion. The side portions being of lesser width than the center portion, the folded side portions do not extend across the full width of the center portion, such that the interior portion of the folded paperband consists of three layers, while the outer portions of the folded paperband consist of two layers. This configuration allows the outer portions of the paperband to more readily bend out of the plane containing the interior portion when the paperband is pulled from a carrier track.

The paperband preferably includes transverse creases, corrugations or undulations to enable the multi-ply board to be formed into a roll of paperband without materially affecting its tensile strength. An adhesive layer is located between each layer in the folded configuration. An adhesive coating may be located on one outer surface or both outer surfaces of the paperband when the paperband is used for baling, depending on the type of adhesive. The undulation parameters are defined by and chosen to increase or decrease stiffness and stretchability. The undulations are provided on the upper and lower surfaces of the paperband. The adhesive layer is preferably water-soluble.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is an end diagrammatic exploded view of a first embodiment of the paperband in accord with the present invention, shown in slightly expanded form for clarity;

FIG. 2 is an end diagrammatic view of a second embodiment of a paperband in accord with the present invention, shown in slightly expanded form for clarity;

FIG. 3 is a perspective view of the paperband of FIG. 1, showing in exaggerated form the transverse creases;

FIG. 4 is a cross-sectional view of a prior art track assembly usable with the paperband of the present invention;

FIG. 5 is an enlarged partial end view of one longitudinal edge of the paperband of FIG. 1 in final form, showing the flexed edge portion in dashed lines.

DETAILED DESCRIPTION OF THE INVENTION

The paperband disclosed herein is formed of a relatively stiff multi-ply paperboard made by a multi-ply board machine folding the paperboard into a tri-layer configuration, the weight and thickness of the paperboard being selected in response to a particular application. The present paperband preferably includes a series of staggered transverse indentations, undulations or creases that result in a slight, barely perceptible, corrugated profile, which provide desired flexibility without a significant sacrifice of overall strength. The lengthwise extent of the transverse creases provides for a level of shock-absorbing capability because a slight stretching of the paperband can occur when high tensile forces are applied during rapid removal of the band from a turn-up track assembly or in strapping applications such as baling.

As understood in the papermaking art, paperband can be made in a manner to provide greater strength in the longitudinal direction represented by the direction of travel of the paperband through the papermaking machine. The present paperband employs paperboard of 8 to 30 points and is stronger in the machine direction lengthwise than cross-machine direction by about 5:1. As is well known in the art, adhesives are used to bond the folded layers of paperboard to each other.

FIG. 1 illustrates in expanded form a first embodiment of the paperband 31 having partially overlapping side portions 32, 33 (as referenced in the pre-folded configuration) with edges 37. The paperboard 31 is preferably provided with a pair of longitudinal score lines or channels 34, 35 delineating the side portions 32, 33 from the center portion 30, which enable easier folding of the side portions 32, 33 onto the center portion 30. The width of each of the side portions 32, 33 is less than the width of the center portion 30, but more than half the width of the center portion 30, such that when folded into the tri-layer configuration the side portions 32, 33 extend beyond the center line of the center portion 30 but do not extend to the opposite edge of the paperband 31, instead defining two lateral portions 51, 52 with only two layers of thickness on either side of the middle three layer portion 50 formed by the overlapping of the two side portions 32, 33 and the center portion 30. This structure defines two longitudinal flexible joints or lines of weakness 36 adjacent the edges 37, enabling the lateral portions 51, 52 to flex in a hinge-like manner relative to the middle three layer portion 50, as shown in FIG. 5, when the paperband 31 is pulled from a track assembly 24. FIG. 4 is a representative prior art track assembly 24, having a band carrier 25 with a channel 28 defined by opposing sets of grooves 26 and guide shoulders 27. This construction allows the paperband 31 to be more easily pulled from the track assembly 24.

Most preferably, transverse scores, creases, or undulations 21 are created in the paperband 31 to provide the desired flexibility. The corrugation defined by the creases 21 is barely susceptible, and the creases 21 allow the stiffness of the paperband 31 to be adjusted by adjusting the spacing and depth of the creases 21. The creases 21 allow for a slight elongation of the band 31 when under tension and provide a "shock absorber" function. Transverse score lines likely would weaken the tensile strength of the band 10 and thus is not encompassed by this invention.

In FIG. 2, a second embodiment of a paperband 38 includes side portions 39 and 40 and a medial or center portion 45 folded to form a generally S-shape. Flexible joints 48 and 49 are created at the transition from three layers to two layers, such that the edges of the paperband 38 are readily flexible as described above.

The preferred paperbands 31 and 38 provide for the use of thinner paperboard (for the same bulk) than other embodiments. This derives from the higher strength/density of the thinner paperboard. The horizontal and vertical symmetry of the completed band is also preferred. The folded edge portions provide for the "flexing" or bending during turn-up and also provide for high resistance to cross-wise tearing of the band and reduced fiber damage during compression-forming of the band. The thinner board also allows for more footage at the same diameter thus providing for fewer splices of the band.

The undulating or wave-like formations of the paperbands are defined in terms of parameters including height, width and number per unit elongate length and are the result of the use of rollers or any other appropriate apparatus. The creation of the creases 21 causes a selectable shortening of the paperband that provides a shock absorbing capability when tensile force is applied to the paperband when it is stripped out of track assembly 24 during turn-up or when being pulled tightly during a baling operation.

In baling pulp it is common for the bale to °grow° or become enlarged as it absorbs moisture from its surroundings. An additional benefit of the corrugations of the band is that it allows for growing of the bale without considerably affecting the overall strength of the band under the circumstances.

While the application has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

I claim:

1. A tri-fold paperband composed of folded paperboard and suitable for use in paper web cutting, turn-up systems and baling, said paperband comprising:
  a paperboard having side portions, a center portion and edges, said side portions being folded inwardly onto a center portion, the width of said side portions being less than the width of said center portion but greater than half the width of the center portion, such that said side portions overlap each other but do not extend completely across said center portion, thereby defining a middle three layer portion and a pair of lateral portions having only two layers;
  said side portions and said center portion being adhesively joined;
  whereby two longitudinal flexible joints are defined adjacent said edges such that said lateral portions readily flex relative to said middle three layer portion.

2. The paperband of claim 1, wherein said side portions are disposed on the same side of said center portion.

3. The paperband of claim 2, further comprising longitudinal score lines delineating said side portions from said center portion and facilitating folding.

4. The paperband of claim 3, further comprising transverse creases.

5. The paperband of claim 2, further comprising transverse creases.

6. The paperband of claim 1, wherein said side portions are disposed on opposite sides of said center portion.

7. The paperboard of claim 6, further comprising longitudinal score lines delineating said side portions from said center portion and facilitating folding.

8. The paperboard of claim 7, further comprising transverse creases.

9. The paperboard of claim 6, further comprising transverse creases.

10. A tri-fold paperband composed of folded paperboard and suitable for use in paper web cutting, turn-up systems and baling, said paperband comprising:
  a paperboard having side portions, a center portion and edges, said side portions being folded inwardly onto a center portion, the width of said side portions being less than the width of said center portion but greater than half the width of the center portion, such that said side portions overlap each other but do not extend completely across said center portion, thereby defining a middle three layer portion and a pair of planar lateral portions having only two layers;

whereby two longitudinal flexible joints are defined adjacent said edges such that said planar lateral portions readily flex in a hinge-like manner relative to said middle three layer portion.

11. The paperband of claim 10, wherein said side portions are disposed on the same side of said center portion.

12. The paperband of claim 11, further comprising longitudinal score lines delineating said side portions from said center portion and facilitating folding.

13. The paperband of claim 12, further comprising transverse creases.

14. The paperband of claim 11, further comprising transverse creases.

15. The paperband of claim 10, wherein said side portions are disposed on opposite sides of said center portion.

16. The paperboard of claim 15, further comprising longitudinal score lines delineating said side portions from said center portion and facilitating folding.

17. The paperboard of claim 16, further comprising transverse creases.

18. The paperboard of claim 15, further comprising transverse creases.

19. A tri-fold paperband composed of folded paperboard and suitable for use in paper web cutting, turn-up systems and baling wherein said paperband is pulled from a track assembly, said paperband comprising:
- a paperboard having side portions, a center portion and edges, said side portions being folded inwardly onto a center portion, the width of said side portions being less than the width of said center portion but greater than half the width of the center portion, such that said side portions overlap each other but do not extend completely across said center portion, thereby defining a middle three layer portion and a pair of planar lateral portions having only two layers;
- whereby two longitudinal flexible joints are defined adjacent said edges such that said planar lateral portions readily flex in a hinge-like manner relative to said middle three layer portion when said paperband is pulled from a track assembly.

* * * * *